United States Patent [19]
Scheidmeir et al.

[11] 3,880,923
[45] Apr. 29, 1975

[54] PRODUCTION OF ALPHA-CHLOROCARBOXYLIC ACID CHLORIDES

[75] Inventors: Walter Scheidmeir, Limburgerhof; Ulrich Bressel; Heinz Hohenschutz, both of Mannheim, all of Germany

[73] Assignee: BASF Aktiengesellschaft, Ludwigshafen (Rhine), Germany

[22] Filed: Dec. 19, 1973

[21] Appl. No.: 426,372

[30] Foreign Application Priority Data
Dec. 27, 1972 Germany............................ 2263580

[52] U.S. Cl............................................ 260/544 Y
[51] Int. Cl............................................. C07c 53/14
[58] Field of Search................................ 260/544 Y Primary Examiner—Lorraine A. Weinberger
Assistant Examiner—Richard D. Kelly
Attorney, Agent, or Firm—Johnston, Keil, Thompson & Shurtleff

[57] ABSTRACT

An improved process for the production of $\alpha$-chlorocarboxylic acid chlorides by reaction of a carboxylic acid chloride with chlorine at elevated temperature, wherein the improvement consists in carrying out the reaction in the presence of sulfuric acid. $\alpha$-chlorocarboxylic acid chlorides are suitable for the production of plant protection agents.

6 Claims, No Drawings

PRODUCTION OF ALPHA-CHLOROCARBOXYLIC ACID CHLORIDES

The present invention relates to an improved process for the production of α-chlorocarboxylic acid chlorides by reaction of a carboxylic acid chloride having a hydrogen atom capable of being replaced which is the α-position to the carboxylic acid chloride group with chlorine at elevated temperature.

Chloroacetyl chloride is usually prepared by reaction of pure chloroacetic acid with inorganic reagents which transfer chlorine such as phosgene, chlorides of phosphorus or sulfur. An obvious disadvantage of this method is that the reagents given here only by way of example have to be used in the stoichiometric amount and the substances thus formed such as carbon monoxide, phosphoric acid or sulfur dioxide cannot be further utilized.

Much effect has been expended over a long period of time with a view of finding an economic process for the production of chloroacetyl chloride. Attempts have been made to chlorinate acetyl chloride direct. This reaction normally proceeds only very slowly and is moreover very unselective. According to German Patent Application I 65,138 it is possible however to accelerate chlorination of acetyl chloride in the presence of chlorinated acetic acids. In spite of this, it is not possible to decrease the content of α,α-dichloroacetyl chloride to an acceptable level.

It is an object of the invention to provide a process which proceeds more rapidly and in which the formation of dichlorocarboxylic acid chlorides which are difficult to separate is decreased. It is another object of the invention to provide a process in which outstanding space-time yields are obtained.

These and other objects and advantages are achieved by an improved process for the production of an α-chlorocarboxylic acid chloride of the formula I:

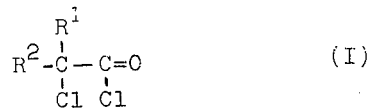

in which $R^1$ and $R^2$ may be identical or different and each is hydrogen or alkyl by reaction of a carboxylic acid chloride of the formula II:

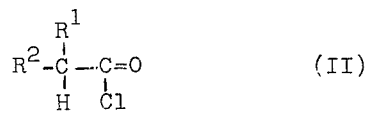

in which $R^1$ and $R^2$ have the above meanings with chlorine at elevated temperature, wherein the improvement consists in carrying out the reaction in the presence of sulfuric acid.

In preferred carboxylic acid chlorides of the formula I $R^1$ and $R^2$ each denotes hydrogen or alkyl of one to twenty carbon atoms which may be linear or branched. It is particularly preferred to use carboxylic acid chlorides of formula II in which $R^1$ and $R^2$ each denotes hydrogen or alkyl of one to four carbon atoms. Acetyl chloride is of special industrial importance. Examples of suitable carboxylic acid chlorides are acetyl chloride, propionyl chloride and butyryl chloride.

It is advantageous to use chlorine in an amount less than that stoichiometrically required. It has been found to be particularly advantageous not to carry the reaction to completion but to stop it when a degree of chlorination (as hereinafter defined) of from 60 to 95% and particularly from 75 to 85% has been reached. When the reaction is carried out continuously, the degree of chlorination is kept within the specified range in the reaction mixture. An advantageous procedure is to use from 0.15 to 0.30 mole of chlorine per mole of carboxylic acid chloride per hour.

The reaction is carried out in the presence of sulfuric acid. It is advantageous to use sulfuric acid having a strength of more than 96% by weight and particularly concentrated sulfuric acid. The carboxylic acid chloride used as starting material advantageously contains from 0.1 to 6% by weight and particularly from 0.5 to 2% by weight of sulfuric acid. The reaction is preferably carried out at a temperature of from 40° to 110°C. Temperatures of from 60° to 90°C have proved to be particularly suitable.

The process may be carried out batchwise or continuously. In principle all apparatus such as are used for reacting a liquid with a gas, for example bubblers and jet nozzles, may be employed.

The process according to the invention may be carried out for example by placing in a vessel a carboxylic acid chloride of formula I and having the said content of sulfuric acid and passing in chlorine at the said temperature, advantageously until the said degree of chlorination has been achieved. It is advantageous to remove the heat of reaction by evaporative cooling. The mixture obtained is fractionally distilled and the desired α-chlorocarboxylic acid chloride is thus isolated in pure form. The reaction is advantageously carried out continuously; carboxylic acid chloride together with the said amount of sulfuric acid is placed in a reactor fitted with a nozzle for the introduction of chlorine over which an impulse exchange tube is arranged, and with an external recycle loop and chlorine is introduced until the said content of α-chlorocarboxylic acid chloride has been reached and then a mixture of carboxylic acid chloride, sulfuric acid and chlorine is continuously supplied while maintaining the said degree of chlorination and the mixture containing the α-chlorocarboxylic acid chloride is continuously withdrawn and processed by distillation. The reaction mixture is continuously recycled through the external loop during the reaction.

The α-chlorocarboxylic acid chlorides and particularly chloroacetyl chloride are suitable for the production of plant protection agents (cf. U.S. Pat. No. 2,863,752).

Terms used are defined as follows, the abbreviations having the following meanings:

AcCl = acetyl chloride;
MCAC = monochloroacetyl chloride;
DCAC = dichloroacetyl chloride:

$$\text{Degree of chlorination:} = \frac{\text{Moles of MCAC} \times 100}{\text{AcCl} + \text{MCAC} + \text{DCAC (in moles)}}$$

$$\text{Chlorine conversion} = \frac{(\text{Moles MCAC} + 2 \times \text{moles DCAC} \times 100}{\text{Moles Cl}_2}$$

$$\text{Yield} = \frac{\text{moles MCAC} \times 100}{\text{moles MCAC} + \text{moles DCAC}}$$

$$\text{Efficiency} = \frac{(\text{moles MCAC} + \text{moles DCAC}) \times 100}{\text{moles AcCl (feed)} = \text{moles AcCl (discharge)}}$$

The process according to the invention is illustrated by the following Examples.

EXAMPLE 1

A bubbler having a length of 60 cm and a diameter of 6.5 cm is fitted at its lower and with a fritted glass disc having a diameter of 6.5 cm and is provided with a cooling jacket. A mixture of 1570 g of acetyl chloride and 94 g of 98% by weight sulfuric acid is placed in the bubbler. 112 liters per hour of chlorine is passed into the mixture through the fritted glass disc and the reaction mixture heats up from 40° to 70°C. The reaction is stopped after four hours. 2077 g of discharge is obtained which according to gas chromatographic analysis contains 3.3% by weight of acetyl chloride, 94.7% by weight of chloroacetyl chloride and 1.9% by weight of dichloroacetyl chloride. The chlorine conversion is 89.7% and the yield of chloroacetyl chloride related thereto is 98.7%. The degree of chlorination is 93.8%.

COMPARATIVE EXAMPLE 1

The procedure described in Example 1 is repeated, but no sulfuric acid is added. The reaction temperature falls from the original 50° to 40°C. The reaction is stopped after four hours. Gas chromatographic analysis of the reaction mixture does not reveal any chloroacetyl chloride.

COMPARATIVE EXAMPLE 2

The procedure of Example 1 is repeated, but 22.4 liters of hydrogen chloride is passed into the reaction mixture per hour instead of sulfuric acid. The reaction is stopped after four hours. The reaction mixture contains 3.35% by weight of chloroacetyl chloride according to gas chromatographic analysis.

EXAMPLE 2

The procedure described in Example 1 is repeated, but 47 g of 98% by weight sulfuric acid is added and 45 liters of chlorine is passed in per hour. In the course of nine hours the original temperature of 42°C rises to 89°C. The content of chlorine in the offgas is 8.3% at the beginning but declines in the course of eight hours to less than 0.1% and then rises to 1.7% after nine hours. After the reaction is over, 1954 g of discharge is obtained which according to gas chromatographic analysis contains 6.3% by weight of acetyl chloride, 91.6% by weight of chloroacetyl choride and 1.5% by weight of dichloroacetyl chloride. This is equivalent to a degree of chlorination of 90%. The chlorine conversion is 90.5%. The yield is calculated to be 99%.

EXAMPLE 3

A mixture of 6620 g of acetyl chloride and 66 g of 98% by weight sulfuric acid is placed in a reaction having a capacity of 4 liters which is provided with an external recycle loop and with a nozzle at its bottom, an impulse exchange tube being arranged 0.8 cm above the nozzle. 180 liters of chlorine is passed in per hour at a temperature of 77°C until a degree of chlorination of 80% has been reached. The contents of the reactor are continuously pumped through the external loop. While maintaining the said conditions 710 ml of acetyl chloride having a content of 1% by weight of concentrated sulfuric acid is fed in per hour and 180 liters of chlorine per hour is fed in through the nozzle. The reaction mixture is withdrawn at the top of the reactor. 770 ml of reaction mixture is obtained per hour. In this way 7385 g of reaction mixture is obtained in the course of seven hours; according to gas chromatographic analysis it contains 11.5% by weight of acetyl chloride, 87.9% by weight of chloroacetyl chloride and 0.60% by weight of dichloroacetyl chloride. Chlorine conversion is 100%; efficiency is 98%. The reaction product thus obtained is subjected to fractional distillation. The pure chloroacetyl chloride has a content of 0.70% by weight of dichloroacetyl chloride.

We claim:

1. An improved process for the production of α-chlorocarboxylic acid chloride of the formula I:

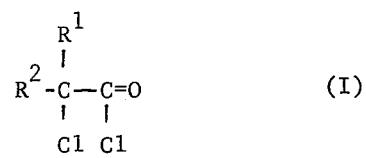

in which $R^1$ is hydrogen or alkyl and $R^2$ is hydrogen or alkyl by the reaction of a carboxylic acid chloride of the formula II:

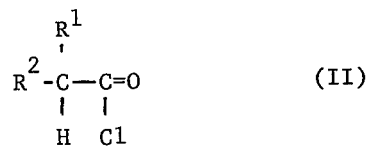

in which $R^1$ and $R^2$ have the above meanings with chlorine at a temperature of from 40° to 110°C, wherein the improvement consists in carrying out the reaction in the presence of sulfuric acid having a strength of at least 96% by weight and in an amount of 0.1 to 6% by weight of sulfuric acid, based on the amount of the carboxylic acid chloride used.

2. A process as claimed in claim 1, wherein a reaction temperature of from 60° to 90°C is maintained.

3. A process as claimed in claim 1 wherein the carboxylic acid chloride of the formula II is acetyl chloride.

4. A process as claimed in claim 3 wherein said amount of sulfuric acid is in the range of 0.5 to 2% by weight, based on the amount of the acetyl chloride used.

5. A process as claimed in claim 3 wherein said amount of sulfuric acid is in the range of 0.5 to 2% by weight, based on the amount of the carboxylic acid chloride used.

6. A process as claimed in claim 1 wherein $R^1$ is hydrogen or alkyl of 1 to 4 carbon atoms and $R^2$ is hydrogen or alkyl of 1 to 4 carbon atoms.

* * * * *